United States Patent Office 3,132,973
Patented May 12, 1964

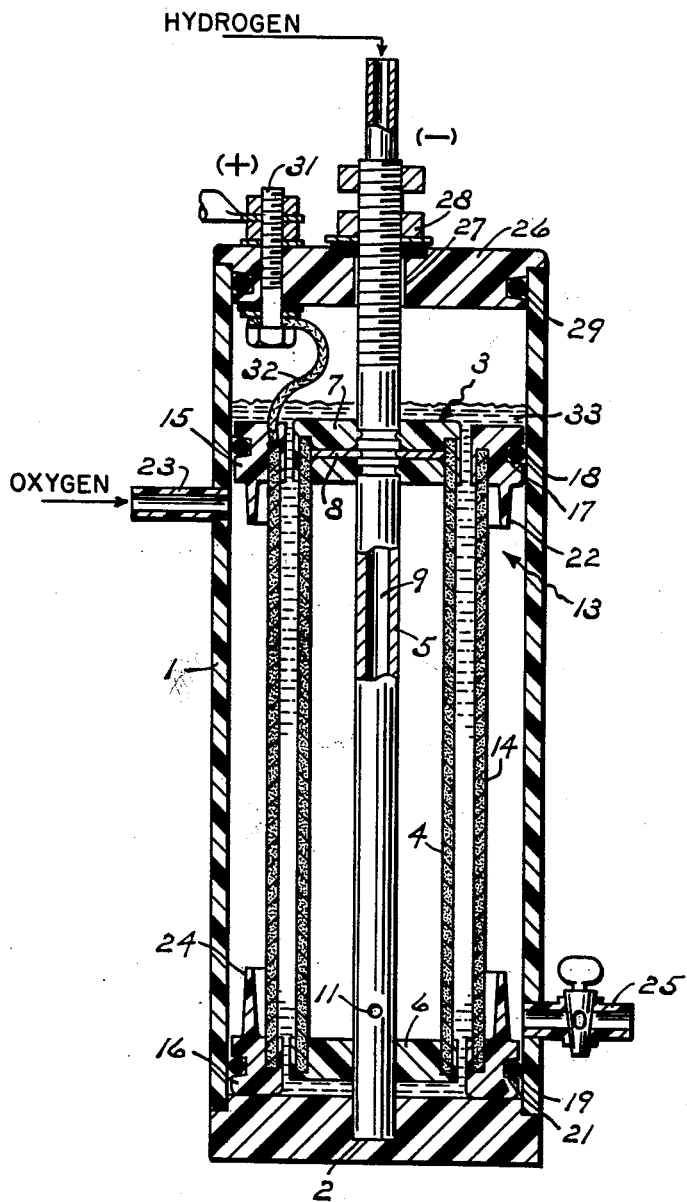

3,132,973
FUEL CELLS
Joseph C. Duddy, Trevose, Pa., and James W. Consolloy, Pennington, N.J., assignors to The Electric Storage Battery Company, a corporation of New Jersey
Filed Nov. 4, 1960, Ser. No. 67,224
7 Claims. (Cl. 136—86)

The present invention generally relates to fuel cells. More specifically, the present invention is concerned with a new and improved construction for fuel cells of the type consuming oxygen and hydrogen as its fuels and utilizing a liquid alkaline electrolyte.

It is the object of the present invention to provide a high efficiency fuel cell for operation at relatively low temperature, that is, at room temperature, the high efficiency being derived to a large extent from the electrode configuration and other novel construction features employed.

Prior to the present invention, fuel cell devices, which convert directly into electricity the free energy of chemical reaction have for substantial current outputs and improved efficiency, operated at relatively high temperatures. Though low temperature fuel cell operation has been obtained, much has been left to be desired in maintaining the voltage for current levels of substantial magnitude.

The present invention is particularly concerned with the provision of a fuel cell configuration utilizing concentric tubular electrodes for both oxygen and fuel gas which provides a fuel cell of unexpectedly high voltages for given current outputs. More particularly, the fuel cell of the present invention is characterized by the utilization of a novel electrode configuration which is functional in eliminating the water formed during cell operation.

Further objects and advantages of the present invention will be readily apparent from the following detailed description of a preferred embodiment thereof when read with reference to the accompanying drawing, which is a sectional elevation of a fuel cell in accordance with the present invention.

Referring now to the drawings, the numeral 1 designates a cell container which is cylindrical in shape and which may be made of a suitable insulating material such as a plastic or hard rubber. As shown, the bottom of the cell container 1 is provided with a cylindrical recess 2 to facilitate the mounting of the fuel or hydrogen consuming electrode assembly generally designated as 3. The functional portion of the fuel electrode assembly 3 comprises a microporous cylinder 4 of sintered silver particles containing metallic palladium or palladium oxide as its catalytic element. The electrode 4 is preferably made in accordance with the teachings of the copending application Serial #33,948, now Patent 3,062,909, of J. C. Duddy, filed June 6, 1960, assigned to the assignee of the present invention. Specific details relating to the manufacture of the electrode 4 will be presented hereinafter.

The fuel electrode 4 is supported and mounted in the cell container 1 by means of a central fuel feed tube 5. The fuel feed tube 5 is preferably constructed of a metal inert to the cell electrolyte such as nickel or stainless steel. The electrode 4 is affixed to the fuel feed tube 5 by means of a pair of molded end caps 6 and 7 which seal the electrode 4 to the tube 5. An epoxy resin has been found to be a suitable material for molding the end caps 6 and 7. The fuel feed tube 5 in addition to functioning as a support for the electrode 4, also functions as the electrical connection thereto. To this end, a connecting disk 8 welded to both the electrode 4 and the gas feed tube 5 is provided. As shown, the connecting disk 8 is cast in the end cap 7. The gas feed tube 5 is provided with a central gas passage 9 which extends substantially the entire length of the feed tube 5 terminating near the lower end of the electrode 4 at a hydrogen output port 11. By locating the hydrogen output port 11 at the lower end of the electrode 4, the static pressure of hydrogen within the electrode 4 at shutdown prevents electrolyte penetration of the electrode 4 beyond the level of the port 11, thereby eliminating the necessity of purging the electrode of electrolyte on start-up.

In the fuel cell of the present invention, the oxygen electrode assembly 13 is mounted concentrically with respect to the hydrogen electrode assembly 3 within the container 1. The functional portion of the oxygen electrode assembly 13 comprises a microporous cylinder 14 of sintered nickel and silver particles. The electrode 14 is also preferably made in accordance with the teachings of the aforementioned co-pending application Serial #33,948 and will be discussed in more detail hereinafter. As shown, the tubular electrode 13 is provided with molded end rings 15 and 16 which are adapted to conform to the interior of the cell container 1. The end ring 15 is provided with an annular recess 17 which houses an O-ring gasket 18 which provides an oxygen and electrolyte tight seal between the oxygen electrode assembly 13 and the interior wall of the cell container 1. Similarly, the end ring 16 is provided with an annular recess 19 which houses an O-ring gasket 21, which provides a seal between the interior wall of the cell container 1 and the oxygen electrode assembly 13 at its lower end.

The top ring 15 is provided with a baffle 22 which extends downward between the oxygen electrode 14 and the interior of the cell container 1. The baffle 22 serves to diffuse oxygen fed to the electrode 14 through an oxygen inlet 23 adjacent thereto in the side of the cell container 1. The end ring 16 is provided with a baffle 24 which extends upwards into the space between the oxygen electrode 14 and the interior of the cell container 1. The baffle 24 is functional in providing a sump for trapping water generated during the operation of the fuel cell which may be discharged from the cell through a water discharge vent 25 adjacent thereto in the side of the cell container 1. To facilitate the collection and the removal of water from the cell during operation, the outer surface of the oxygen electrode 14 and the inner surface of the cell container 1 are preferably sprayed with a suitable hydrophobic material such as a fluorocarbon resin. The other novel features of the fuel cell of the present invention which aid in water removal will be discussed in more detail hereinafter.

The cell container 1 is provided with a cover 26 having a central opening 27 adapted to fit over the fuel gas feed tube 5. The cover 26 is held in place by means of a nut 28 which is screwed around the gas feed tube 5 which is threaded for this purpose. A seal is maintained between the cover 26 and the cell container 1 by means of an O ring gasket 29 held in an annular recess in the side of the cover 26. The cover 26 also includes the positive terminal 31 of the fuel cell which is electrically connected to the oxygen electrode 14 by means of the flexible connector 32. As shown, the cell is adapted to be filled with a suitable alkaline electrolyte 33 to an operating level which covers the electrodes 4 and 14 and which fills the space between them.

As mentioned hereinbefore, both the hydrogen electrode 4 and the oxygen electrode 14 are made in accordance with the teachings of the aforementioned co-pending application, Serial #33,948. As taught in that application, the electrodes 4 and 14 are produced by a process in which two intimately mixed incompatible thermoplastic resins, one of which is soluble in a solvent and the other is insoluble, are utilized as a temporary binder for the powdered metal electrode material to be structurized by subsequent sintering. The soluble thermoplastic resin is removed after the shaping of the electrode but prior to the sintering thereof to leave the structure to be sintered porous. In this manner there are provided uniformally distributed pores in the electrode for the escape of the gaseous products produced by the thermal decomposition of the insoluble thermoplastic resin during sintering. Following the removal of the soluble resin phase, the electrode is dried and heated to a temperature of about 375° F. to 450° F. to remove therefrom the low molecular factions of the insoluble thermoplastic resin. This heat treatment step is carried out while the electrode is rotated so that it maintains its cylindrical shape. The electrode is next heated to a temperature of about 450° F. to 550° F. to remove therefrom the remainder of the insoluble resin and to lightly sinter the electrode material. It is then further heated to the sintering temperature customary for the material from which the electrode is made to further strengthen the bond between the sintered particles. For the production of both the hydrogen electrode 4 and the oxygen electrode 14, polyethylene oxide has been found to be the preferred soluble resin binder and polyethylene the preferred non-soluble resin binder. Polyethylene oxide is preferred because it is water soluble. The hydrogen electrode 5 is preferably made of sintered finely divided particles of silver having uniformly dispersed therethrough about 1% by weight of finely divided metallic palladium oxide. The oxygen electrode 14 is preferably made of a sintered mixture of finely divided silver and nickel particles in which the nickel is present in an amount of from about 10% to 40% by weight of the silver.

As will be understood by those skilled in the art, the manner in which the free energy of the chemical reaction between the gases and the electrolyte is directly converted into electricity can be expressed by the following equations:

At the Oxygen Electrode

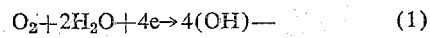  (1)

When oxygen is supplied to the oxygen electrode, hydroxyl ions are formed within the electrolyte. In forming such ions, there is utilized electrons, thus leaving the electrode positively charged or with a deficiency of electrons. The negatively charged hydroxyl ions are diffused through the electrolyte, or migrate through the electrolyte to the hydrogen electrode.

At the Hydrogen Electrode

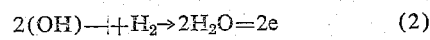  (2)

With hydrogen flowing to the hydrogen electrode, the hydrogen is ionized. It reacts with the hydroxyl ions to form water with release of electrons. Accordingly, if the electrodes are connected to an external circuit, current will flow. Thus, the fuel reactions are dependent upon the flow of electrons from the hydrogen electrode through the external circuit to the oxygen electrode. In accordance with a generally recognized convention, the oxygen electrode from the standpoint of the external circuit may be considered as the positive electrode, and the hydrogen electrode as the negative electrode.

The water produced during the operation of the fuel cell in accordance with the present invention condenses as minute droplets on the inner wall of the container 1. As operation progresses these minute droplets coalesce and drain downward being collected in the sump formed between the baffle 24 and the inner wall of the cell container 1. In considering why this occurs, it should be understood that the oxygen electrode 14 is wetted with electrolyte on its inner surface and perhaps outward therefrom a short distance. Accordingly, from that point outward to the internal surface of the electrode there exists a very high wetted surface area from which water can evaporate, especially if the temperature of the cell interior exceeds the ambient. In effect then, the concentric cell design may be considered to be a still which operates on an extremely small temperature differential, to eliminate the water produced during fuel cell operation. If the electrolyte space between the concentric electrodes is of the proper order, the internal resistance loss produced therein is functional in providing the internal heating responsible for the temperature differential necessary for generation of the water vapor and its removal from the fuel cell. Depending on the temperature differential produced and the associated heat capacity of the system, there will be formed varying amounts of water condensate, these amounts being equal to, greater than, or less than, that quantity of water formed by the fuel cell reaction.

It should be understood that the same phenomena would occur if the hydrogen electrode had been chosen as the outermost electrode and the oxygen electrode the inner electrode. Consequently in designing a concentric oxygen and hydrogen fuel cell system in accordance with the present invention the selection of relative electrode positions is determined solely on the basis of the efficiencies of the particular electrodes to be utilized. With respect to the electrodes described hereinbefore, the fuel electrode was selected as the innermost electrode, which is inherently the smaller, because of its higher efficiency. It should also be understood that the hydrophobic coating on the interior wall of the cell container 1 mentioned hereinbefore is an aid in facilitating the condensation and subsequent coalescing of the water which collects on the inner surface of the container 1. As mentioned hereinbefore, it is also advantageous to provide a similar coating on the outer wall of the oxygen electrode 14. This coating is operative in preventing excessive electrolyte penetration through the electrode 14 and into the space between the electrode 14 and the cell container 1. An emulsion of tetrafluoroethylene has been found to be a suitable material for this purpose.

By way of example of the performance of a fuel cell in accordance with the present invention, a cell was constructed in which the apparent unprojected surface area of the inner wall of the oxygen electrode was 33.9 square inches while that of the outer wall hydrogen electrode was 23.6 square inches. The space between the concentrically positioned electrodes was on the order of one-eighth of an inch. A 20% solution of potassium hydroxide was utilized as the cell electrolyte. The equilibrium gas flow condition was established at 3 pounds per square inch gage pressure for hydrogen, and at 7½ pounds per square inch gage for oxygen. The immediate open circuit voltage of the system was zero volts but as time progressed, that is, as the hydrogen continued to diffuse through the fuel electrode, the cell voltage slowly rose until the equilibrium value at open circuit was 1.08 volts. This situation is normal when starting a cell utilizing new electrodes but thereafter a starting period is unnecessary. A load of one ampere was applied and the equilibrium voltage for the cell was observed to be 0.95 volt. Thereafter the cell load was carried upward until the cell was delivering 20 amperes. Cell voltages for various current loads are shown in the table below.

| Cell voltage: | Current, amps. |
|---|---|
| 1.08 | Open circuit |
| 0.98 | 0.5 |
| 0.95 | 1.0 |
| 0.91 | 2.5 |
| 0.84 | 5.0 |
| 0.72 | 10.0 |
| 0.62 | 15.0 |
| 0.52 | 20.0 |

From the foregoing, it can be seen that the construction described hereinbefore provides a high efficiency fuel cell for operation at relatively low temperatures. In addition, the electrode configuration described in which Having described the present invention, that which is claimed as new is:

1. An electrochemical cell for the conversion of the free energy of the reaction between gaseous oxygen and gaseous hydrogen directly into electricity comprising a cell container, a pair of gas electrodes spaced apart from each other and concentrically positioned within said container, means positioning said outer electrode in a spaced relationship from said container wall which means seals the space between said container wall and said outer electrode at both ends of said outer electrode, means for introducing a gas into the sealed space between said outer electrode and said cell container, means for sealing the ends of the inner electrode, means for introducing a gas into the central portion of said inner electrode, baffle means extending upward at the bottom of said cell into said space between said outer electrode and said cell container and spaced therefrom, an alkaline electrolyte in the space between said concentrically positioned electrodes, the spacing between said electrodes being such that the internal resistance of said cell causes internal cell heating which causes water in the electrolyte to vaporize into the said space between said outer electrode and said container wall and to condense on the inner wall of said cell container, said water collecting in the spaces between said container wall and said baffle means and being removed from said cell container by venting means in association with the space between said baffle means and said cell container wall.

2. An electrochemical cell in accordance with claim 1 in which said electrodes are tubular, microporous, sintered metallic electrodes.

3. An electrochemical cell in accordance with claim 1 in which said outer electrode is the oxygen electrode and said inner electrode is the hydrogen electrode.

4. An electrochemical cell for the conversion of the free energy of the reaction of gaseous oxygen and gaseous hydrogen directly into electricity comprising a cell container, a pair of tubular concentrically positioned electrodes in said container, said inner electrode being sealed on both ends and having a gaseous feed tube extending through said sealed ends and supporting said inner electrode in said cell container, said gas feed tube having an output port at the lower end of said electrode, means positioning said outer electrode in a spaced relationship from said container wall which means seals the space between said outer electrode and said cell container at the ends of said outer electrode, means in said cell container for introducing a gas into the space between the said outer electrode and said cell container, baffle means extending upward at the bottom of said cell into said space between said outer electrode and said cell container and spaced therefrom, and an alkaline electrolyte in the space between the said concentrically positioned electrodes, the spacing between said electrodes being such that the internal resistance of said cell causes internal cell heating thereby causing water to vaporize from said electrolyte and to condense on the inner wall of said cell container, said water collecting in the space between said cell container and said baffle means and being removed from said cell container by venting means in association with the space between said baffle means and said cell container wall.

5. An electrochemical cell in accordance with claim 4 in which the outer electrode is an oxygen electrode and the inner electrode is a hydrogen electrode.

6. An electrochemical cell in accordance with claim 5 wherein the inner wall of the fuel cell container is treated with a hydrophobic material.

7. An electrochemical cell in accordance with claim 4 in which there is an upper baffle means extending downwardly from the upper sealing means and positioned within the space between said outer electrode and said cell container opposite the means in said cell container for introducing a gas, said upper baffle means being spaced from said outer electrode and said cell container.

References Cited in the file of this patent

UNITED STATES PATENTS

| | | |
|---|---|---|
| 2,384,463 | Gunn et al. | Sept. 11, 1945 |
| 2,901,523 | Justi et al. | Aug. 25, 1959 |
| 3,002,039 | Bacon | Sept. 26, 1961 |
| 3,012,086 | Vahldieck | Dec. 5, 1961 |